United States Patent Office 3,737,444
Patented June 5, 1973

3,737,444
CONTINUOUS PROCESS FOR THE SEPARATION OF MIXTURES OF FATTY ACIDS OF DIFFERENT MELTING POINTS
Helmut Hartmann, Langenfeld, Rhineland, and Werner Stein, Erkrath-Unterbach, Germany, assignors to Henkel & Cie G.m.b.H., Dusseldorf-Holthausen, Germany
Filed Dec. 29, 1970, Ser. No. 102,471
Claims priority, application Germany, Dec. 31, 1969, P 19 65 644.1; June 20, 1970, P 20 30 529.7
Int. Cl. C09f 5/10
U.S. Cl. 260—419          16 Claims

ABSTRACT OF THE DISCLOSURE

The invention relates to an improvement of the known continuous process for the separation of solid and liquid fatty acids, particularly of commercial oleic acid and commercial stearic acid, in which the starting mixture by treating with an aqueous wetting agent solution is converted to a dispersion of liquid fatty acids and solid fatty acid particles, the formed dispersion is separated by centrifuging into two phases of different specific weights, the lighted phase consists substantially of the liquid fatty acids and the heavier phase of a dispersion of the solid fatty acid particles in the aqueous wetting agent solution. After separation of this suspension the wetting agent solution is returned to the process. The improvement consists in withdrawing a part of the recycling wetting agent solution from the cycle and replacing it with fresh wetting agent solution.

THE PRIOR ART

U.S. Pat. 2,800,493 discloses a process for the separation of mixtures of fatty acids into fatty acid mixtures of different melting points. This process involves preparing a dispersion of liquid fatty acids and separated solid fatty acid particles in an aqueous solution containing wetting agents and, optionally, non-surface-active electrolytes, and separating this dispersion with the aid of solid-jacket centrifuges into two phases of which one consists substantially of the liquid fatty acids and the other of a suspension of the solid fatty acids in the aqueous wetting agent solution. The solid fatty acid particles and the aqueous wetting agent solution are then separated in a known manner, e.g., by filtration or by melting of the solid fatty acids, so that the latter as a continuous liquid phase can be separated from the aqueous phase. The aqueous wetting agent solution, free fatty acids, is then recycled in the process. This separation principle has become known under the name "Rewetting or Hydrophilization Process." This process is used technically to a large extent for the separation of distilled tallow fatty acids into oleic acid and stearic acid. It can, however, be also used for the separation of other fatty acids, such as mixtures of practically saturated fatty acids of different melting points.

OBJECTS OF THE INVENTION

An object of the present invention is the development of an improvement in the "Rewetting or Hydrophilization Process" whereby better separation of the higher and lower melting point mixtures of fatty acids are obtained continuously over long periods of time.

Another object of the present invention is the development of a continuous process for the separation of mixtures of fatty acids containing from 0.8% to 15% by weight of non-fatty acid organic impurities derived from the preparation of said fatty acid mixtures into fatty acid mixtures of different melting points by the steps of continuously dispersing said mixture of fatty acids consisting of an oily phase and a solid phase in a recycling aqueous wetting agent solution at a temperature whereby a dispersion of liquid and solid fatty acids is obtained, continuously separating said dispersion by centrifuging into a lighter phase consisting substantially of liquid fatty acids and a heavier phase consisting substantially of solid fatty acid particles dispersed in said aqueous wetting agent solution, continuously withdrawing said liquid fatty acids, continuously separating said solid fatty acids from said aqueous wetting agent solution, continuously withdrawing said solid fatty acids having a higher melting point than said liquid fatty acids, continuously recycling said aqueous wetting agent solution to said dispersing step, and continuously withdrawing a part of said recycling aqueous wetting agent solution and continuously replacing said withdrawn part of said recycling aqueous wetting agent solution with a fresh aqueous solution whereby the concentration of said recycling aqueous wetting agent solution is maintained substantially constant.

These and other objects of the present invention will become more apparent as the description thereof proceeds.

THE DRAWINGS

DESCRIPTION OF THE INVENTION

Figure 1:
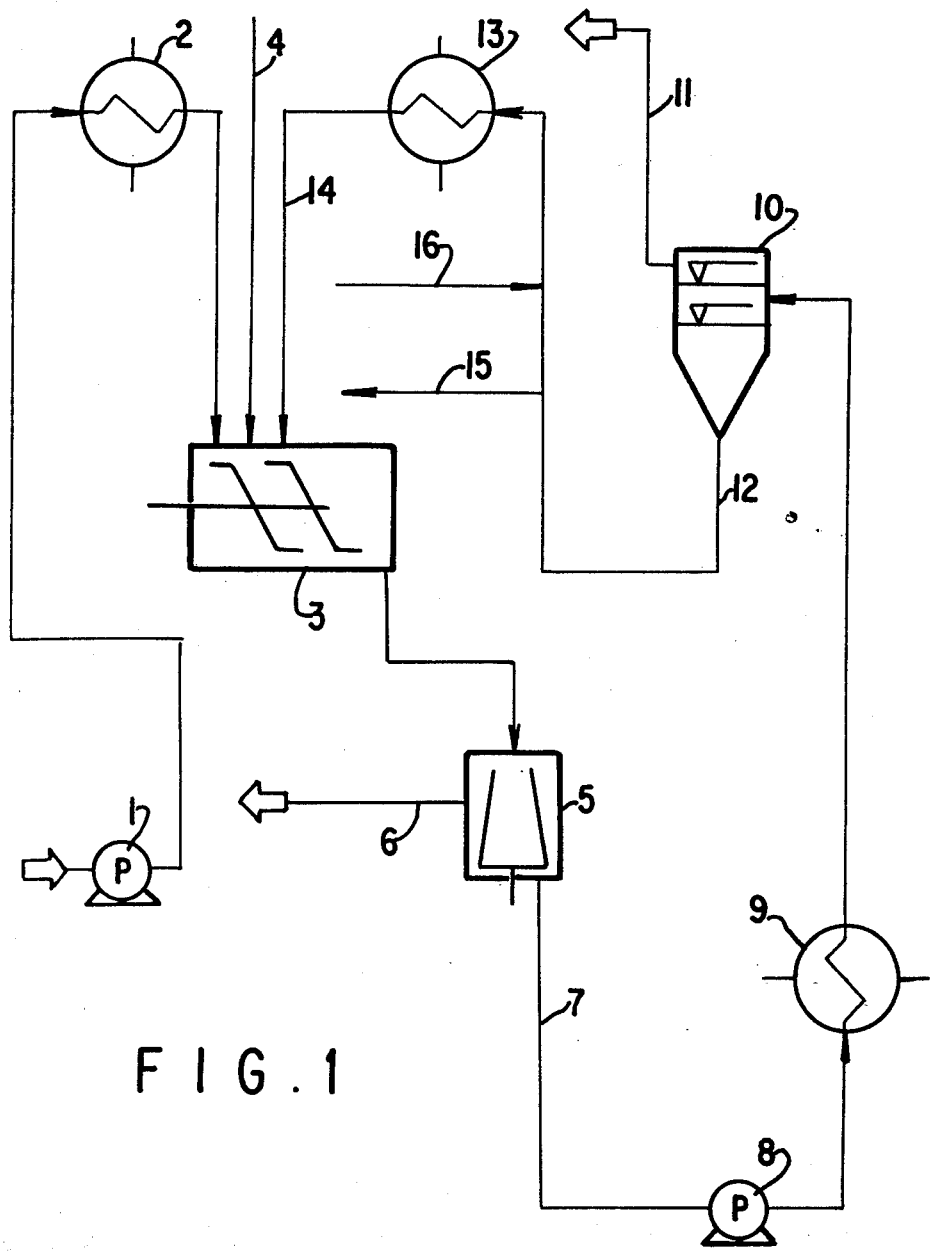
FIG. 1 is a flow diagram of the process of the invention.

The invention relates to an improved continuous process for the separation of mixtures of fatty acids into ingredients of different melting points by the application of the known hydrophilization process. The process, according to the invention, is characterized in that in the processing of fatty acid mixtures, which contain 0.8% to 15%, by weight, preferably 1% to 10% by weight, of non-fatty acid organic impurities, a part of the recycling aqueous wetting agent solution is withdrawn from the cycle and the withdrawn amount of wetting agent solution is replaced by water or by fresh aqueous solution containing wetting agents and/or electrolytes. In the event water is the replacing material, the concentration of the recycling aqueous wetting agent solution is maintained by a separate addition of the wetting agents and/or electrolytes.

The term "non-fatty acid organic impurities" is to be understood to be organic substances which are derived from the raw material serving for the preparation of the mixtures of fatty acids or from the processing of the mixtures of fatty acids, to be separated. These organic substances are those whose composition does not correspond to the formula R—COOH where R is a hydrocarbon containing 7 to 27, preferably 9 to 21 carbon atoms, straight or branched aliphatic, optionally cycloaliphatic, saturated or unsaturated. As a matter of simplification, in the following specification the mixture to be separated, of fatty acids of different melting points is called "starting material," the liquid phase obtained in the separation is called "oil," the solid phase obtained in the separation is called "solid ingredients," and the aqueous solution used as an aid in the separation is called "solution." The term "solid ingredients" is used for the higher melting fatty acids even when they are present under the then prevailing process conditions in a liquid state.

Under "organic impurities" in the sense of the above definition are to be understood, among others, the substances occurring in natural fats, which in the cleavage or saponification of these fats do not furnish fatty acids but remain in the fatty acid mixtures. In addition, in fatty acids of synthetic origin, the "organic impurities" include the unreacted starting materials for the preparation of these fatty acids, such as paraffins, olefins, alcohols, aldehydes, etc., which, after the optional working up of the crude fatty acids, remain partially or completely in the products of the process. These "organic impurities" may be acidic, ester-like or unsaponified products, such as hydroxyfatty acids, fatty acid peroxides, fatty acid hydroperoxides, dicarboxylic acids (such as dimeric fatty acids) partial glycerides, fatty acid or hydroxyfatty acid esters of hydroxyfatty acids, alcohols, aldehydes, ketones, phosphatides, sterols, carotinoids, tocopherol, gossypol and other phenolic components, hydrocarbons, as well as decomposition products of the above-mentioned substances. Some of these "organic impurities" may be separated from the fatty acids by distillation. Others have about the same boiling range as the fatty acids so that a purificaion of the fatty acid mixtures by distillation only is not always possible. All of these "non-fatty acid organic impurities" are derived from the preparation of processing of the mixture of fatty acids starting material to be separated by the process of the invention. Hereinafter, for the sake of simplicity they will be designated by "NF." The amount of these impurities can be determined by known analytical procedures. To be sure, the decision if a certain starting material has to be processed according to the process of the invention, does not always require the preceding analytical determination of all these above-mentioned "NF" components. It is mostly sufficient for the practice of the invention to determine the amounts of non-saponifiable material (US) and the amounts of partial or tri-glycerides. If the sum of these two "NF" components does not greatly exceed the above minimum amounts, the determination of the other "NF" components is not required.

It has already been suggested to add organic solvents to the fatty acid mixture to be separated with the aid of the hydrophilization process, in order to attain in this way, in the crystallization of the solid ingredients, an improvement of the separation effect. These organic solvents are in the spirit of the invention not to be considered as impurities derived from the preparation or the processing of the fatty acids.

The amount of recycling aqueous wetting agent solution to be withdrawn, or of the substituting fresh aqueous solution, are generally between less than 10% to 70% by weight of the recycling aqueous wetting agent solution. Specifically, the amount depends approximately on the amount of "NF" present in the starting material. If the amount of "NF" is from 0.8% to 4%, preferably 1% to 3% by weight (such amounts of "NF" are frequently found in distilled fatty acid mixtures) the amount of recycling solution to be withdrawn and replaced is mostly in the range of more than 10% to 40%, preferably from 15% to 30% by weight. If, however, starting materials of a lesser degree of purity are processed, in which the amount of "NF" is in the range of 4% to 15% by weight (a typical example of this are undistilled cleaved fatty acids with from 90% to 97% cleavage), it is recommended to withdraw and replace from 20% to 70% by weight of the recycling aqueous wetting agent solution.

The hydrophilization process is of practical importance in the separation of distilled tallow fatty acids into commercial oleic acid (sometimes called oleine) and commercial stearic acid (sometimes called stearine) because it combines the considerable advantages of continuous operations without the use of inflammable organic solvents in simple apparatus. The prior procedures for the separation of distilled tallow fatty acids involved pressing out of the oleic acid from the solidified fatty acid mixtures or crystallization of the stearine from a solution of the tallow fatty acids in an organic solvent at low temperatures and filtration of the crystals. On the other hand, applicants have discovered, on investigation of the known hydrophilization process, that the separation results with undistilled cleaved fatty acid mixtures, qualified by different qualities of the raw product, is subjected to great fluctuations. This considerably impairs the advantage of this process for these starting mixtures. By the invention, it now has become possible to also process starting mixtures, independent of quality of the parent raw products, with invariably good results. In addition, as indicated, the process of the invention has proven advantageous also in the separation of distilled fatty acid mixtures.

The knowledge of the causes for the occasionally unsatisfactory separation results in the processing of special starting materials cannot be deduced from the prior literature. It is, therefore, unexpected for the applicants to have recognized this technical problem. The variant of the process, suitable for the solution of this problem, worked out by them subsequently, has the surprising advantage that it does not require special measures outside of the hydrophilization process, such as separate special purification operations. Fatty acid mixtures with "NF" present therein can be processed, although the presence of these components has been found to be the cause for the difficulties occasionally arising in the known procedure.

The starting mixtures to be processed according to the invention can be prepared from the most varied fats of plant or animal origin; also starting mixtures of synthetic origin can be used. As examples for such fats may be mentioned: coconut fat or palm-kernel fat, palm oil, cottonseed oil, sunflower oil, peanut oil, rapeseed oil, castor oil, lard, tallows of various origins and fish and whale oils. Although the separation of tallow fatty acids into oleine and stearine has been found economically particularly interesting, mixtures of saturated and unsaturated fatty acids of different origins may also be processed. For example, partially hydrogenated fatty acids, particularly where the fatty acids to be hydrogenated are to a large extent multiple unsaturated fatty acids, and also mixtures of substantially saturated fatty acids, for instance, practically completely hardened fatty acid mixtures or practically completely saturated fatty acid mixtures of synthetic origin, may be separated into fractions of different melting points, according to the process of the invention.

The starting mixtures are appropriately utilized by preparing them in the molten state and gradually cooling them to the temperature at which the separation is to take place. For this cooling, appropriately a scraping condenser is used. These are tubes with a cooling jacket whose inner surface is kept free of crystallizing solid ingredients by rotating scrapers. If, however, the starting material is to be freed of only small amounts of solid ingredients, it can be cooled down with good success also in a standard stirred vessel. The starting mixture is cooled to the point where the separation temperature is attained, and an amount of solid ingredients corresponding to this temperature has separated out. An advantageous process variant has been found in which the starting material is recycled from a storage container through a scraping condenser to the storage container for a time until the complete contents of the storage container are cooled to the separation temperature. In this process variant, a heat exchange takes place between the cooled material leaving the scraping condenser and the warmer material still in the storage container. It has been found that by this procedure a better separation results than in the process of direct cooling of the starting mixture in the scraping condenser to the separation temperature.

The mixture of oil and solid ingredients thus obtained is then dispersed in the aqueous wetting agent solution which previously was appropriately brought to the separation temperature. The aqueous wetting agent solution is utilized in the amount of 0.3 to 3, preferably 1 to 2, parts by weight, based on 1 part by weight of the cooled starting mixture.

In addition to soaps, anionic or nonionic water-soluble compounds which lower the surface tension of the aqueous solutions are utilizable. A removal of the liquid ingredients of the starting mixture from the surface of the solid ingredients occurs with the aid of the aqueous wetting agent solution. The following compounds which contain an alkyl radical with 8 to 18, preferably 10 to 16 carbon atoms in the molecule are useable in addition to soap as wetting agents: alkylbenzene sulfonates, alkylsulfonates, fatty alcohol sulfates, sulfated reaction products of fatty alcohols adducted with 1 to 10, preferably 2 to 5, mols of ethylene oxide and/or propylene oxide, monoglyceride sulfates, etc. The anionic wetting agents named are preferably used in the form of their sodium salts; but they can also be used in the form of their other alkali metal, ammonium and lower alkylolamine salts, such as potassium, ammonium, mono-, di- or triethanolammonium salts. The water soluble adducts of ethylene oxide to alkylphenols or fatty alcohols are useable as nonionic compounds.

Appropriately, such amounts of wetting agents are used that in the dispersion formed, immediately prior to the entry in the separation centrifuge, 0.05 to 2, preferably 0.1 to 1, parts by weight of wetting agent per 100 parts by weight of aqueous solution are present. The above amounts for the wetting agents include not only the wetting agents actually dissolved in the aqueous phase, but also the amounts of wetting agent dissolved in the oil or adsorbed on the surface of the solid ingredients.

The effect of the aqueous wetting agent solution is improved if it contains dissolved non-surface-active electrolytes, inert to the starting mixtures. To this belong, e.g., the water soluble chlorides, sulfates, or nitrates of mono- to trivalent metals, particularly of the alkali, alkaline earth and earth metals. Above all, additions of sodium sulfate and magnesium sulfate have proven desirable. The electrolyte concentration of the dispersion, to be separated, lies in the range of 0.1% to 10%, preferably 0.5% to 2%, by weight. These numerical data, as also above in the case of the wetting agent concentration, are calculated on the total amount of electrolytes present in the dispersion based, however, on the aqueous phase present in the dispersion. In connection with this invention, by aqueous wetting agent solution, preferably a wetting agent solution containing electrolytes is meant.

In the mixing of the cooled starting mixture with the wetting agent solution, the oil is displaced from the surfaces of the solid ingredients. It has been found appropriate to combine the cooled starting mixture first with only a partial amount of the correspondingly more concentrated wetting agent solution and to bring the so-formed more concentrated aqueous wetting agent solution gradually by addition of water, electrolyte solution, or correspondingly more dilute wetting agent solution to the desired final concentration. Advantageously, the cooled starting mixture is first combined with 5% to 50%, preferably 10% to 30%, of the total wetting agent solution to be used, and gradually so much of further solution is added that the desired final concentration is attained. Since the wetting agent solution recycled from the process is preferably used for dilution, the wetting agent content of the more concentrated wetting agent solution to be initially combined with the cooled starting material results from the amount and wetting agent content of the wetting agent solution in the dispersion to be separated, and from the wetting agent content of the recycled wetting agent solution and also from the partial amount of wetting agent solution with which the cooled starting material is first combined.

The above-described procedure for the preparation of the dispersion to be separated can be varied in different ways. Thus, for instance, it is possible to cool the starting mixture to be separated together with the wetting agent solution, to the separation temperature. Thereby a completely melted down starting mixture can be used. In addition, the starting mixture can first, in the absence of the wetting agent solution, be cooled down so far until a part, preferably 30% to 85%, particularly 40% to 70%, by weight of the total solid ingredients, to be separated, has crystallized, and, after addition of the wetting agent solution, to further cool to the separation temperature. A special means of performing this latter process variant has proven particularly advantageous. The precooled starting mixture in which solid particles have already separated is first dispersed in a partial amount of more concentrated wetting agent solution. The thus obtained more concentrated dispersion is then cooled further to the separation temperature by the addition of cooler dilute wetting agent solution, cooler water or cooler electrolyte solution and brought to the desired wetting agent and electrolyte concentration. Ice also can be used for this purpose.

In the processing of the starting mixture described so far, small amounts of air can enter into the dispersion and impair the separation result. Thus air can be removed simply, for instance, by slow agitation of the dispersion.

The dispersion is then passed into a solid-jacket centrifuge where it is separated into two phases of different specific weights. The solid-jacket centrifuge is required to maintain the dispersion at the desired separation temperature. The most varied types of centrifuges are suitable. For instance, tube centrifuges, disk centrifuges, or scaling centrifuges can be used. Above all, the shell centrifuge has been found useful, where the phases are removed from the centrifuge by scaling off tubes.

Two phases leave the centrifuge; the lighter one, the oil, consists substantially of the liquid ingredients of the starting mixture, the other heavier one is a suspension of the solid ingredients in the aqueous wetting agent solution. After washing and optionally drying, the oil can be withdrawn for its designed purpose. It can also again be separated by the process of the invention at a lower separation temperature, in order to obtain thus an oil with a suitably lower turbidity point.

The suspension of the solid ingredients in the wetting agent solution leaving the centrifuge may be processed further in various ways to separate the solid particles from the aqueous wetting agent solution. Thus, the solid particles can be separated from the wetting agent solution proper, for instance, by filtration, centrifuging, etc. It has been proven particularly appropriate to melt the solid particles by heating the suspension and to separate the thereby obtained two phases in separatory apparatus, or with the aid of other devices.

A part of the thereby obtained aqueous wetting agent solution is discarded and replaced by fresh water, by electrolyte solution, or by wetting agent solution. The amount of the recycled wetting agent solution which is to be withdrawn and replaced by fresh wetting agent solution is dependent upon the nature of the respective starting mixture to be processed. These amounts have, therefore, to be adapted during the operation of the unit to the requirements. They have to be varied in order that the optimum improvement of the separation results in a continuous operation is attained with the lowest possible amount of wetting agent solution being withdrawn and replaced.

The wetting agent solution may be withdrawn at any point of the cycle, or simultaneously at several points and/or be replaced by a fresh aqueous phase. Preferably, it is removed after the separation of the wetting agent solution from the melted solid ingredients.

In the enclosed FIG. 1, a flow diagram suitable for the execution of the separation process, according to the invention, is illustrated. The melted starting mixture, to be separated, is conducted through the feed pump 1 to the scraping condenser 2, and leaves it as a pasty mixture of oil and solid ingredients. This mixture passes into the mixer 3 which, advantageously, consist of several mixing chambers connected in series, each of which is provided with a stirrer. In the first mixing chamber the cooled starting material is stirred up with the more concentrated wetting agent solution, flowing in through the line 4, to give a dispersion. In the successive mixing chambers, the more dilute wetting agent or electrolyte solution is intermixed. Thereby, a dispersion is formed in which the oil particles and the particles of the solid ingredients are separately dispersed in the wetting agent solution.

This dispersion is then separated with the aid of a solid-jacket centrifuge 5 into the oil as the lighter phase and a dispersion of the solid particles in the wetting agent solution as the heavier phase. The oily lighter phase is withdrawn by line 6. The heavier phase is conducted through line 7 to the feed pump 8 which passes the material to the heater 9 where the solid ingredients are melted. The molten solid ingredients and the wetting agent solution move then together to the separator 10 from which the molten solid ingredients leave at line 11 as the lighter phase and the wetting agent solution leaves at line 12 as the heavier phase. This heavier aqueous phase is recycled through the heat exchanger 13, through the line 14 to the mixer 3. In the process, according to the invention, a part of the wetting agent solution leaving at line 12 is withdrawn through the line 15. The corresponding amount of fresh solution is added through the line 16. It is, however, not absolutely necessary to introduce the fresh solution where in FIG. 1 the line 16 discharges into the line 12 coming from the separator 10. Naturally, the fresh solution can be charged directly as wetting agent or electrolyte solution into the mixer 3, particularly into the successively arranged mixing chambers designed for the dilution of the first formed dispersion.

According to a further embodiment of the invention, at least one of the two obtained fatty acid fractions, the lower melting (oil) and/or the higher melting (solid ingredients) can be converted to a dispersion of separated solid and liquid fatty acid particles in aqueous wetting agent solution, and from this a lower melting and a higher melting fatty acid ester fraction can be isolated.

If the oil, obtained in a preceding separation, is processed according to the invention procedure, it is cooled by one of the above-described methods, i.e., in the absence or also the presence of aqueous wetting agent solution, in comparison to the first separation step, to a suitably lower separation step, to a suitably lower separation temperature (cold step). The wetting agent solution circulating in the second separation step can form its own wetting agent solution cycle separated from that of the first separation step. The wetting agent solution may, however, also flow through both separation steps.

The renewed application of the invention process to the oil obtained in a preceding separation step has, for example, the purpose of removing small amounts of higher melting ingredient from it, particularly to lower the turbidity point of the commercial oleic acid or oleine produced. In this case the higher melting fraction obtained as solid ingredients is frequently returned to the process cycle, preferably of the preceding separation step. It can, however, also be desired to separate the oil into two fractions of different melting ranges which are isolated as such in a known manner, and are used for their respective designed purposes.

If the process is applied at correspondingly higher temperatures to the solid ingredients obtained in a preceding separation step (warm step), it can be carried out according to two process variants. The one variant consists in heating the wetting agent solution with the dispersed solid ingredients in it so that a part of the solid ingredients melts and now forms an oil in this dispersion. The second variant consists in completely melting the solid ingredients and to convert them again, as described above, to a dispersion of separated particles of oil and solid particles, from which the oil and the solid ingredients are isolated, however, at a higher temperature than was the case in the first separation step. These possibilities are of particular importance where, in the oleine/stearine separation from tallow fatty acids, the stearine fraction obtained is to be converted to a stearine with a lower iodine value. In this case, the oil fraction obtained hereby is appropriately returned to the first separation step. The process can, however, also be used to separate the solid ingredients obtained in the first separation step into two fractions with different intended uses.

It is not required to withdraw wetting agent solution from the successive separation steps. However, one can also maintain a few wetting agent recycles at that point without withdrawal, these recycles being independent from the wetting agent recycle of other separation steps, particularly of the first separation step.

Depending upon the nature of the starting mixture processed in the first separation step, it may, however, be advantageous to work also in the successive separation steps with wetting agent solutions from which partial streams are withdrawn, and which were treated with a fresh aqueous phase, i.e., with a fresh wetting agent solution, a fresh electrolyte solution, free of wetting agent, or with fresh water, free of wetting agent and electrolyte.

Since the wetting agent solution used in the first separation step consists partly of fresh aqueous phase, the wetting agent solution obtained after the first separation step may also be used in the successive separation steps.

The wetting agent solution used in a successive separation step may, however, also consist at least partly of an aqueous phase which has previously not yet been used for separation. This is always the case when a fresh aqueous phase is introduced into a successive separation step.

In such a successive step, either the oil obtained in the preceding separation step or the solid ingredients obtained in the preceding separation step can be processed. The latter are preferably melted for this purpose and converted to a dispersion of separated liquid and solid fatty acid particles in aqueous wetting agent solution. Then the fresh aqueous phase is added to the used wetting agent solution or to the dispersion.

Insofar as the wetting agent solution used in the preceding separation step is also applied in the successive separation step, it is recommended to withdraw the part of the wetting agent solution to be withdrawn after the separation of the solid ingredients in a successive separation step, preferably in the last separation step. If there are several separation steps succeeding the first separation step, the wetting agent solution used may be withdrawn at one point or at several points simultaneously, for instance, after the first separation step, after the cold step, or after the warm step. Advantageously, the fractions obtained after the separation of the solid ingredients are combined and the desired amount of wetting agent solution is withdrawn from the combined total.

Since, according to the invention, it is irrelevant where the used wetting agent solution is withdrawn and fresh aqueous phase is added, the exchange of wetting agent solution in the first separation step can be omitted when withdrawing the wetting agent solution after the last separation step and addition of fresh aqueous phase in a successive separation step, provided the wetting agent solution from the successive separation steps is recycled into the first separation step.

Figure 2:
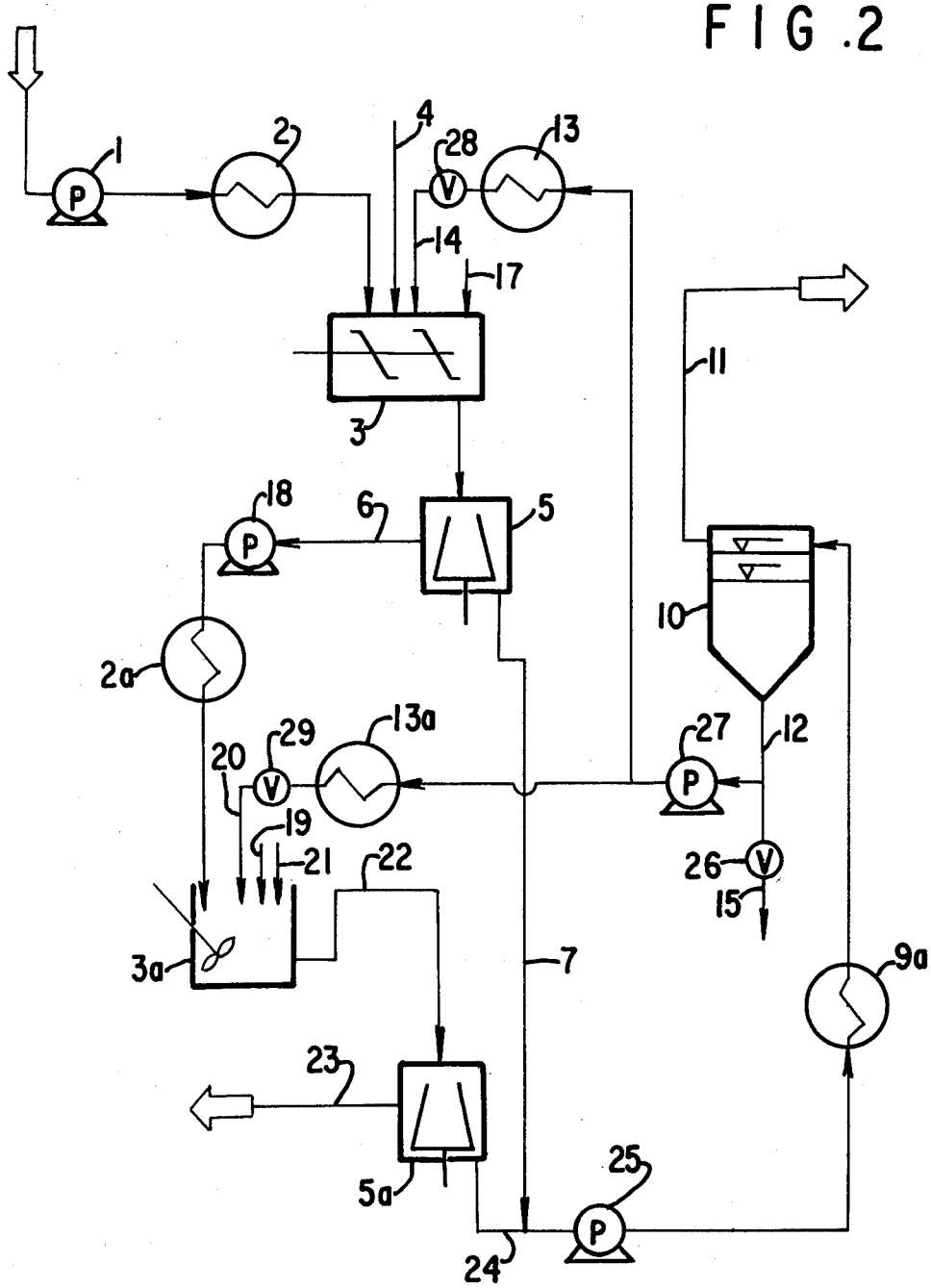
FIG. 2 is a flow diagram of another embodiment of the process of the invention.

In FIG. 2, a flow diagram for the renewed separation of the oil obtained in a first separation step is illustrated schematically. The liquid starting mixture is pumped through the metering pump 1 and through the scraping condenser 2. There it is converted to a pasty mixture of oil and solid ingredients, suitable for the separation. This pasty mixture passes to the mixer 3 where it is converted with more concentrated wetting agent solution (from line 4), more dilute wetting agent solution (from line 14) and electrolyte solution (from line 17) to a dispersion of separated particles of oil and solid ingredients in aqueous wetting agent solution. This mixer 3 has appropriately several mixing chambers through which successively the phases to be mixed flow, or it consists of several mixing vessels connected in series. In this way, it is possible first to combine the cooled starting mixture with more concentrated wetting agent solution and to dilute this subsequently by the addition of more dilute aqueous wetting agent solution and/or electrolyte solution, free of wetting agent, to a lower wetting agent concentration. This dispersion flows into the solid-jacket centrifuge 5 from which at line 7, as the heavier phase, an aqueous suspension of the solid ingredients in aqueous wetting agent solution leaves, and at line 6 an oil as the lighter phase leaves.

The oil is conducted through the pump 18 into a second scraping condenser 2a. The mixture of oil and solid ingredients, suitable for separation, thereby obtained is passed into a second mixing vessel 3a in which it is dispersed in aqueous wetting agent solution. For this purpose, for instance, a more concentrated wetting agent solution through line 19, a more dilute wetting agent solution through line 20, as well as, optionally, an electrolyte solution through line 21 are run in with agitation. A dispersion of separated particles of oil and solid ingredients in aqueous wetting agent solution are formed. Also this mixer 3a may have, as the one in the first step, several mixing chambers, or may consist of a number of mixing vessels, connected in series, so that also here the cooled starting material may first be combined with more concentrated wetting agent solution, which dispersion is subsequently diluted to a lower wetting agent concentration. This dispersion is passed through line 22 and is separated, as in the first step, in a second solid-jacket centrifuge 5a into the oil leaving as the lighter phase at line 23 and the suspension of solid ingredients in aqueous wetting agent solution leaving as the heavier phase at line 24.

The solid ingredients obtained as suspension in aqueous wetting agent solution at line 7 or line 24, respectively, differ in their melting points or their iodine number. Thus, for example in oleine/stearine separation, the solid ingredients obtained at line 7 contain less oleine than the ones obtained at line 24. If desired, the solid ingredients obtained in the second step may be returned to the process in any way. For instance, after separation from the aqueous wetting agent solution they are admixed with the still liquid starting material leaving the scraping condenser 2a. They can, however, also be processed together with the suspension obtained at line 7, as illustrated in FIG. 2. For this purpose, the combined suspensions are pumped by pump 25 through the heater 9a where they are heated to a temperature above the melting point of the solid ingredients. The mixture of molten solid ingredients and wetting agent solution is then passed into the separator 10 in which the molten solid ingredients and dilute wetting agent solution are separated. The melted solid ingredients are withdrawn through line 11 and the aqueous wetting agent solution through line 12. A part of the wetting agent solution withdrawn from the separator 10 is discarded through the valve 26 at line 15 and thus removed from the cycle. Another part is passed through pump 27 and the heat exchangers 13 or 13a, to the controlling valves 28 or 29, and into the mixer 3 or 3a.

Since a part of the recycling wetting agent solution is withdrawn at line 15 and fresh aqueous phase is added at line 17, also in the mixer 3a, a wetting agent solution is used of which a part was replaced by a fresh aqueous phase at lines 19 or 21.

Figure 3:
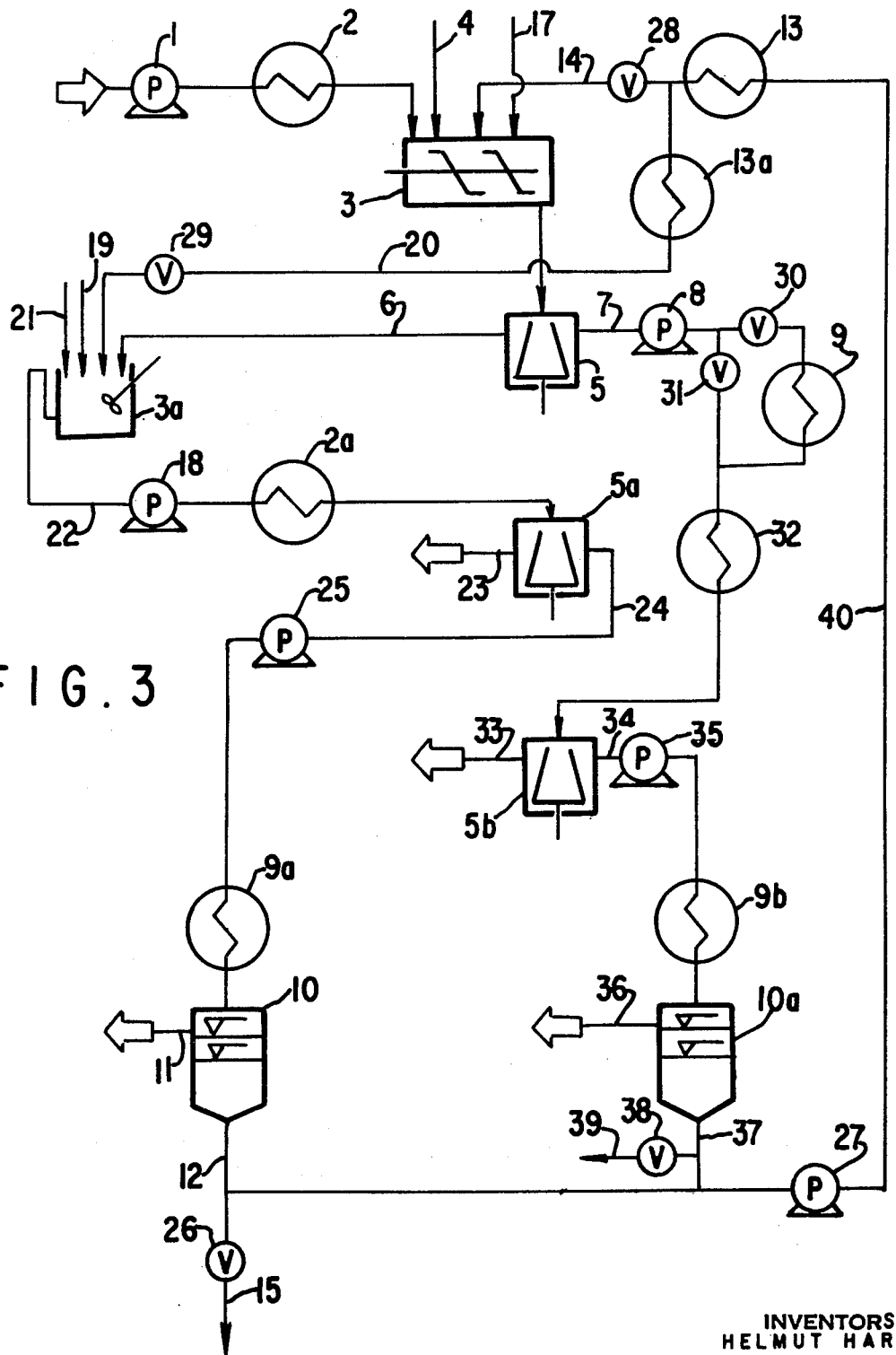
FIG. 3 is a flow diagram of still another embodiment of the process of the invention.

In FIG. 3 a flow diagram for the renewed separation, at higher and lower temperatures, of both fractions obtained in the first separation step is illustrated. The starting mixture, to be separated, is pumped by the pump 1 through the scraping condenser 2 into the mixer 3. This is preferably constructed in the manner described above. It consists of single mixing chambers through which the starting mixture is successively passed. In the first mixing chamber the starting mixture leaving the cooling and crystallizing scraping condenser 2 is first combined with more concentrated wetting agent solution through line 4. Water, free of wetting agent or electrolyte solution free of wetting agent can be added through line 17, and wetting agent solution recycled from the process is added through line 14. The dispersion formed in the mixer 3 flows into the centrifuge 5 and is there separated into two phases. The heavier phase, present as a suspension of solid ingredients in aqueous wetting agent solution is discharged through the line 7 and the pump 8, while the lighter phase consisting substantially of oil is discharged through the line 6.

For the separation of small amounts of higher melting ingredients (cold step) still present in this oil, it is conducted through the line 6 into the mixer 3a. The latter may only consist of a simple mixing vessel. In the mixer 3a, the oil is admixed with the wetting agent solution, returned from the process through line 20. If desired, through the lines 19 or 21 more concentrated wetting agent solution and/or water, free of wetting agent, or electrolyte solution, free of wetting agent, may be supplied. The aqueous solutions added at this point may have lower temperatures than the oil. For this purpose the recycling aqueous wetting agent solution can be cooled through the heat exchanger 13a. The amount of this aqueous wetting agent solution is measured out by the valve 29. The dispersion formed in the mixer 3a, in which certain amounts of crystallized solid ingredients may already be present, is passed through the line 22 and the pump 18 into the scraping condenser 2a where it is cooled to the separation temperature. From there it is passed to the centrifuge 5a from which an oil is withdrawn at line 23 as the lighter phase whose turbidity point is lower than the turbidity point of the oil leaving the centrifuge 5. At line 24 a suspension of solid ingredients in aqueous wetting agent solution is obtained as the heavier phase which is pumped by pump 25 through the heater 9a and leaves it as a mixture of aqueous wetting agent solution and molten solid ingredients. In the separator 10 this mixture is separated into the molten solid ingredient withdrawn at line 11 and the aqueous wetting agent solution withdrawn at line 12. A part of this wetting agent solution can be withdrawn and discarded through the valve 26 and the line 15.

There are two possibilities for the processing at elevated temperature (warm step) of the suspension of solid ingredients in aqueous wetting agent solution leaving the centrifuge 5: either the total dispersion is heated to a temperature where a part of the solid ingredients melts, or the suspension is heated to the complete melting of the solid ingredients and then cooled to the separating temperature of the warm step. In the first case the pump 8 feeds the suspension, with valve 30 closed, through the open valve 31 to a combination heating and cooling apparatus 32, from which then a dispersion of separated oil and solid particles in aqueous wetting agent solution leaves. In the second case the pump feeds the suspension, with the valve 31 closed, over the open valve 30 to the heat exchanger 9 where the solid ingredients are completely melted. The emerging mixture is converted in the successively connected combination heating and cooling and crystallizing apparatus 32 to a dispersion of separated particles of oil and solid ingredients in aqueous wetting agent solution. Either of these dispersions are separated in the centrifuge 5b into the oil, withdrawn as the lighter phase at line 33, and the suspension of solid ingredients in aqueous wetting agent solution, withdrawn as the heavier phase at line 34. The pump 35 feeds this suspension into the heater 9b. The mixture of wetting agent solution and molten solid ingredients formed is separated in the separator 10a into the molten solid ingredients withdrawn at line 36 and into the aqueous wetting agent solution. The latter is withdrawn at line 37. A part of the wetting agent solution can be withdrawn from its circulation through the valve 38 and the line 39.

The part of the warm wetting agent solution leaving the separators 10 and 10a not withdrawn from circulation, is returned together to the process through the pump 27 and the line 40 and is cooled by passage through the heat exchanger 13 to the temperature at which it shall enter into the first step. The valves 28 and 29 control the partial amounts of recycling aqueous wetting agent solution which are returned to the first or to the cold step.

By the process scheme, according to FIG. 3, four fractions of different melting points or turbidity points are obtained. If tallow fatty acids are separated in this manner into stearine and oleine, the oleine recovered from the cold step and the stearine recovered from the warm step are the proper products of the process. The two other fractions of fatty acids are returned to the starting material to be processed in the first separation step.

The following examples are illustrative of the process of the invention without being deemed limitative in any respect.

EXAMPLES

In Examples 1 to 4, in each case two different starting materials were processed according to the flow diagram of FIG. 1. The two starting materials were undistilled cleaved fatty acids and distilled cleaved fatty acids. The cleaved fatty acids were prepared from triglycerides by hydrolysis with water at elevated temperatures and pressures and subsequent separation of the aqueous phase, containing glycerine. The distilled cleaved fatty acids were distillates of these cleaved fatty acids.

Of the more dilute wetting agent solution introduced through line 14 into the mixer 3, 10% was supplied as more concentrated wetting agent solution, the remainder was supplied as more dilute wetting agent solution or as electrolyte solution. These solutions had, unless something different was expressly stated, the same temperature as the mixture of oil and solid ingredients leaving the scraping condenser 2.

The data contained in the examples about the wetting agent and/or electrolyte contents are valid for the dispersion formed in the mixer 3 in which the separated oil particles and particles of the solid ingredients were present as dispersion in the wetting agent solution. The data on the wetting agent and/or electrolyte contents include the total of the amounts of wetting agent and/or electrolyte present in such a dispersion calculated, however, on the aqueous phase.

Although the higher melting fractions obtained were present in the molten stage, for reasons for simplicity they are named as "solid ingredients" in the examples. The separation results obtained according to the invention are compared in the Examples 1 to 4 with those which are obtained in a similar process without the withdrawal of a part of the wetting agent solution. This procedure is indeed known in its general characteristics, but the details described herein are derived from internal, unpublished investigations; therefore, the comparative examples are not to be considered as prior art. The NF amounts given in the examples are the sums of the determination of the U.S. and the glyceride contents. The last are calculated from the analytically determined content of ester-like bound glycerine with the mathematical calculation that all glycerine was present as a diglyceride (in fact: mixtures of mono, di, and triglycerides) and that the fatty acids present in the glycerides have the same average molecular weight as the free fatty acids.

EXAMPLE 1

(a) Processing of distilled tallow fatty acid (Acid No.=204, Saponification No.=206, I. No.=52, NF=1% by weight)

(1) 1 t./h. (1000 kg./h.) of this starting mixture was cooled in the scraping condenser to 5° C. The pasty mixture of oil and solid ingredients obtained was first admixed witht 0.3 t./h. of more concentrated and subsequently with 1.2 t./h. of more dilute wetting agent solution, so that the dispersion leaving the mixer contained, per one part by weight of the cooled starting material, 1.5 part by weight of wetting agent solution. This wetting agent solution had a wetting agent content of 0.25% by weight of sodium decylsulfate and an electrolyte content of 1% by weight of $MgSO_4$. The dispersion was then separated into an oily and an aqueous phase. As oily phase, 0.39 t./h. of oleine with a turbidity point of 4° C. were obtained. After processing of the aqueous phase, 0.61 t./h. of stearine with an I. No.=28 were obtained. The aqueous wetting agent solution was totally recycled.

(2) If, however, the same fatty acid was processed by the invention process, that is, with continuous withdrawal of 0.2 t./h. of wetting agent solution from the cycle, and substitution of the withdrawn amount by the same amount of a 1% $MgSO_4$ solution with the simultaneous metering of so much of more concentrated wetting agent solution, that the wetting agent content of the dispersion was held permanently at the calculated value, 0.52 t./h. of stearine (I. No.=17) and 0.48 t./h. of oleine (turbidity point=4° C.) were obtained. By the process variant, according to the invention, a purer stearine and a higher yield of oleine were obtained.

(b) Processing of undistilled cleaved fatty acid from tallow (Acid No.=199, Saponification No.=206, I. No.=53, NF=4.5% by weight)

(1) This starting mixture was substantially processed under the same conditions as described in Example 1a(1). The content of sodium decylsulfate in the dispersion was, however, increased to 0.3% by weight. In spite of the increased wetting agent content, the separation results were unsatisfactory. After processing 0.355 t./h. of oleine (turbidity point 4° C.) and 0.645 t./h. of stearine (I. No.=31) were obtained.

(2) If, however, according to the invention, with constant sodium-decylsulfate content, 0.5 t./h. of the wetting agent solution was removed from the cycle and replaced by 0.5 t./h. of 1% $MgSO_4$ solution, 0.46 t./h. of oleine (turbidity point 4° C.) and 0.54 t./h. of stearine (I. No.=19) were obtained.

EXAMPLE 2

(a) Processing of distilled cottonseed oil fatty acids (Acid No.=202, Saponification No.=204, I. No.=103, NF=1.7% by weight)

Comparative procedure: Starting mixture cooled to 5° C. (separation temperature). Dispersion formed from 1 t./h. of cooled fatty acids, 0.4 t./h. of more concentrated wetting agent solution, diluted with 1.3 t./h. of recycled wetting agent solution. Composition of the wetting agent solution: 0.25% by weight of sodium decylsulfate and 2% by weight of $Na_2SO_4$.

Process products:

0.77 t./h. of liquid fatty acids (turbidity point 6° C., I. No.=127)

0.23 t./h. of solid fatty acids (I. No.=26)

Procedure according to the invention: Withdrawn wetting agent solution: 0.4 t./h. replaced by $Na_2SO_4$ solution with constant wetting agent and $Na_2SO_4$ content.

Process products:

0.78 t./h. of liquid fatty acids (turbidity point 6° C., I. No.=127)

0.22 t./h. of solid fatty acids (I. No.=18)

(b) Processing of undistilled cleaved fatty acid from cottonseed oil (Acid No.=197, Saponification No.=204, I. No.=103, NF=4.4% by weight)

Comparative procedure: Starting mixture cooled to 5° C. (separation temperature). Dispersion formed from 1 t./h. of cooled fatty acids, 0.4 t./h. of more concentrated wetting agent solution diluted with 1.5 t./h. of recycled wetting agent solution. Composition of the wetting agent solution 0.45% by weight of sodium decylsulfate and 2.5% by weight of $Na_2SO_4$.

Process products:

0.735 t./h. of liquid fatty acids (turbidity point 3° C., I. No.=128)

0.265 t./h. of solid fatty acids (I. No.=33)

Procedure according to the invention: Withdrawn wetting agent solution: 0.7 t./h. replaced by $Na_2SO_4$ solution with constant wetting agent and $Na_2SO_4$ content.

Process products:

0.770 t./h. of liquid fatty acids (turbidity point 3° C., I. No.=128)

0.230 t./h. of solid fatty acids (I. No.=21)

EXAMPLE 3

(a) Processing of a distilled palmkernal fatty acid fraction (Acid No.=203, Saponification No.=205, I. No.=47, NF=1.4% by weight)

The starting material was obtained by cleaving of palmkernel fat, distilling off of all constituents below $C_{16}$, renewed cleaving of the distillation residue and redistillation of the cleaving product.

Comparative procedure: Starting mixture cooled to 15° C. (separature temperature). Dispersion formed of 1 t./h. of cooled fatty acids, 0.1 t./h. of more concentrated wetting agent solution, diluted with 0.9 t./h. of recycled wetting agent solution. Composition of the wetting agent solution: 0.25% by weight of sodium coconutalkylsulfate and 1.5% by weight of $MgSO_4$.

Process products:

0.38 t./h. of liquid fatty acids (turbidity point 13° C., I. No.=88)

0.62 t./h. of solid fatty acids (I. No.=22)

Process according to the invention: Withdrawn wetting agent solution: 0.25 t./h. replaced by $MgSO_4$ solution with constant wetting agent and $MgSO_4$ content.

Process products:

0.43 t./h. of liquid fatty acids (turbidity point 13° C., I. No.=88)

0.57 t./h. of solid fatty acids (I. No.=16)

(b) Processing of the undistilled cleaved palmkernal fatty acid fraction, according to (a) (Acid No.=190, Saponification No.=205, I. No.=48, NF=8.2% by weight)

Comparative procedure: Starting mixture cooled to 15° C. (separation temperature). Dispersion formed from 1 t./h. of cooled fatty acids, 0.3 t./h. of more concentrated wetting agent solution, diluted with 1.1 t./h. of recycled wetting agent solution. Composition of the wetting agent solution: 0.25% by weight of sodium coconut alkylsulfate and 1.5% by weight of $MgSO_4$.

Process products:

0.315 t./h. of liquid fatty acids (turbidity point 13° C., I. No.=88)

0.685 t./h. of solid fatty acids (I. No.=29)

Procedure according to the invention: Withdrawn wetting agent solution: 0.4 t./h. replaced by $MgSO_4$ solution with constant wetting agent and $MgSO_4$ content.

Process products:

0.42 t./h. of liquid fatty acids (turbidity point 13° C., I. No.=88)

0.58 t./h. of solid fatty acids (I. No.=18)

EXAMPLE 4

(a) Processing of distilled cleaved fatty acid from fish oil (Acid No.=199, Saponification No.=201, N. No.=126, NF=1.8% by weight)

Comparative procedure: Starting mixture cooled to 5° C. (separation temperature). Dispersion formed from 1 t./h. of cooled fatty acids, 0.2 t./h. of more concentrated wetting agent solution, diluted with 1.2 t./h. of recycled wetting agent solution. Composition of the wetting agent solution: 0.3% by weight o fsodium decylsulfate and 2% by weight of $MgSO_4$.

Process products:

0.79 t./h. of liquid fatty acids (turbidity point 6° C., I. No.=151)

0.21 t./h. of solid fatty acids (I. No.=31)

Procedure according to the invention: Withdrawn wetting agent solution: 0.45 t./h. replaced by $MgSO_4$ solution with constant wetting agent and and $MgSO_4$ content.

Process products:

0.81 t./h. of liquid fatty acids (turbidity points 3° C., I. No.=151)

0.19 t./h. of solid fatty acids (I. No.=23)

(b) Processing of undistilled cleaved fatty acids from fish oil (Acid No.=199, Saponification No.=201, I. No.=128, NF=5.0% by weight)

Comparative procedure: Starting mixture cooled at 5° C. (separation temperature). Dispersion formed from 1 t./h. of cooled fatty acids, 0.5 t./h. of more concentrated wetting agent solution diluted with 1.5 t./h. of recycled wetting agent solution. Composition of the wetting agent solution: 0.5% by weight of sodium decylsulfate and 2% by weight of $MgSO_4$.

Process products:

0.795 t./h. of liquid fatty acids (turbidity point 3° C., I. No.=152)

0.205 t./h. of solid fatty acids (I. No.=34)

Procedure according to the invention: Withdrawn wetting agent solution: 0.45 t./h. replaced by $MgSO_4$ solution with constant wetting agent and $MgSO_4$ content.

Process products:

0.81 t./h. of liquid fatty acids (turbidity point 3° C., I. No.=152)

0.19 t./h. of solid fatty acids (I. No.=24)

In the procedure described in the Examples 1 to 4, the throughput can be raised with constant size of the scraping condensers and constant separation results by cooling the starting mixture in the scraping condenser not quite to the separation temperature and by adjusting the separation temperature by dispersing of the fatty acid mixture in correspondingly cooler wetting agent solution. Thereby, the temperature difference between fatty acid mixture and wetting agent solution may, for instance, amount to 10° C.

EXAMPLE 5

Undistilled fatty acids (Acid No.=203, Saponification No.=207, I. No.=53, NF=1.2%), obtained by cleaving of tallow, served as the starting mixture.

For the application of the process, the above described, and in the attached FIG. 2, illustrated flow diagram was used. 2 t./h. of the starting mixture were cooled to 27° C. in the scraping condenser 2. The thereby obtained mixture of oil and solid ingredients was admixed in the first mixing chamber of the mixer 3 with a 27% sodium decylsulfate solution added at line 4. In the further mixing chambers were added 2.2 t./h. of a more dilute wetting agent solution at 20° C. and a $MgSO_4$ content of 1% added at line 14, and 0.8 t./h. of a 1% $MgSO_4$ solution at 16° C., free of wetting agent added at line 17. The 27% more concentrated wetting agent solution was measured out in such amounts that the wettting agent content of the formed dispersion was 0.22% by weight of sodium decylsulfate. (This concentration statement results from the total amount of wetting agent contained in the dispersion, however, referred to the aqueous phase present in it.) By temperature exchange between the cooled starting mixture coming from the scraping condenser and the cooler dilute wetting agent solution and magnesium sulfate solution, further solid ingredients were separated out. The obtained dispersion had a temperature of 21° C. This dispersion was separated in a solid-jacket centrifuge 5, into 1.15 t./h. of oil with a turbidity point of 20° C. and a suspension of 0.85 t./h. of solid ingredients in about 3 t./h. of aqueous wetting agent solution.

The oil obtained in the first separation step was cooled in the scraping condenser 2a to 10° C. and admixed in the first mixing chamber of the mixer 3a with 27% sodium decylsulfate solution. In the succesively arranged mixing chambers, 1.6 t./h. of wetting agent solution, returned from the process at a temperature of 2° C. was admixed. The 27% sodium decylsulfate solution, added in the first mixing chamber was measured out in such an amount that the wetting agent content of the dispersion was 0.2% by weight of sodium decylsulfate (see the explanations in the text for the concentration statement). By the heat exchange between the cooled starting mixture of the second step and the colder wetting agent solution for the parts of solid ingredients separated out. The dispersion was then separated in the solid-jacket centrifuge 5a into 0.92 t./h. of a lighter phase, consisting of oleine with a turbidity point of 4° C. and into a heavier phase, consisting of 0.23 t./h. of solid ingredients and 1.6 t./h. of wetting agent solution.

The suspensions of solid ingredients in wetting agent solution, obtained in the first and second separation steps were blended together and passed through the heater 9a. By heating to about 90° C., the commercial stearine melted and was obtained in an amount of 1.08 t./h. with an iodine number of 20. 0.8 t./h. of about 4.6 t./h. of recycling wetting agent solution was withdrawn from the cycle at line 15. The withdrawn aqueous solution was replaced by about 0.8 t./h. of a 1% MgSO$_4$ solution added at line 17 while the wetting agent solution was maintained by the addition of the 27% sodium decylsulfate solution.

EXAMPLE 6

This example describes the processing of an undistilled fatty acid mixture (Acid No.=204, Saponification No.=207, I. No.=49, NF=0.9%), obtained by the splitting of beef tallow of technical quality into oleine and commercial stearine with use of an apparatus according to FIG. 3, whereby the fractions obtained in the first separation step were separated in one successively arranged step each (warm step or cold step). Part of the wetting agent solution was withdrawn after the warm or cold step while fresh solution was added in the first step and optionally also in the cold step.

The starting mixture was cooled to 30° C. with a throughput of 1 t./h. in the scraping condenser 2 and admixed in the mixer 3 with 0.2 t./h. of a 1% Na$_2$SO$_4$ solution at 28° C. added at line 17, and 1.4 t./h. of a 1% NaSO$_4$ solution at 20° C., recycled from the process, containing sodium dodecylsulfate added at line 14. In addition, such amounts of a 10% sodium dodecylsulfate solution were measured out and added at line 4, that the dispersion leaving the mixer 3 with a temperature of 29° C. contained 0.10% by weight of sodium dodecylsulfate, based on the aqueous phase. From the centrifuge 5, 604 kg./h. of oleine (I. No.=74) and an aqueous dispersion of 396 kg./h. of a commercial stearine (I. No.=11) were separated.

This dispersion was led through the warm step with the aid of the feeding pump 8, with the valve 30 closed, passed the valve 31 and through the scraping cooler 32, heated with hot water. A warm dispersion at 49.3° C. of oil and solid ingredients was formed which was separated in the solid-jacket centrifuge 5b, maintained at 49° to 50° C. At line 33, 72 kg./h. of a liquid fatty acid (I. No.=35) were obtained. The suspension of the solid ingredients in aqueous wetting agent solution was fed through the pump 35 to the heat exchanger 9b and then heated to 90° C. From the separator 10a at line 36, 324 kg./h. of a commercial stearine (I. No.=6.1) were obtained.

The 604 kg./h. of oleine at 29° C., obtained in the first separation step, were admixed in the mixer 3a with 500 kg./h. of recycled sodium dodecylsulfate solution containing 1% of Na$_2$SO$_4$ at a temperature of 16° C. added at line 20, and with as much of 10% sodium dodecylsulfate solution added at line 21 that the sodium dodecylsulfate content of the formed dispersion, containing already certain amounts of solid ingredients, was 0.18% by weight, based on the aqueous phase. This dispersion was cooled in the scraping condenser 2a to 8° C., and separated in the solid-jacket centrifuge 5a into 416 kg./h. of oleine (I. No.=90, Turbidity point 6° C.) and into an aqueous suspension of 188 kg./h. of solid fatty acid (I. No.=38) in aqueous wetting agent solution.

The 416 kg./h. of oleine (I. No.=90) obtained in the cold step, and the 324 kg/h. of commercial stearine (I. No.=6) obtained in the warm step, are considered as final products, the intermediate fractions (188 kg./h. of fatty acids) (I. No.=38) solid at 8° C., and the 72 kg./h. of fatty acids (I. No.=35) liquid at 49° C., were combined and returned to the process.

Of the wetting agent solution, obtained at line 12 and line 37, freed of molten solid ingredients, so much was removed through the valves 26 and 38 that continuously about 30% by weight of the total circulating wetting agent solution was withdrawn and replaced.

EXAMPLE 7

This example describes a variant of the procedure according to Example 6, which is restricted to the warm step. The dispersion obtained in the first separation step of 396 kg./h. of crude commercial stearine (I. No.=11) was led through the feed pump 8 with valve 31 closed, through the open valve 30 to the heat exchanger 9 and then heated to 55° C., whereby the crude commercial stearine completely melted. In the scraping condenser 32, a warm suspension of oil and solid ingredients in aqueous wetting agent solution was formed at 49.7° C. From the centrifuge, 75 kg./h. of liquid fatty acids (I. No.=39) and, after the processing of the suspension of solid ingredients in aqueous wetting agent solution, 321 kg./h. of purified commercial stearine (I. No.=4.5) were obtained.

EXAMPLE 8

This example describes the processing of a fatty acid mixture (Acid No.=206, Saponification No.=208, I. No.=50, NF=0.7%) obtained by cleaving of beef tallow of technical quality and subsequent distillation. The working conditions were to a large extent identical to that in Example 6. It suffices, therefore, only to mention the process condition deviating from the data of Example 6.

First separation step

Wetting agent content of the dispersion: 0.17% by weight of sodium dodecylsulfate Separation products:
619 kg./h. of oleine (I. No.=74)
381 kg./h. commercial stearine (I. No.=11)
Separation products in the warm step:
65 kg./h. of liquid fatty acids (I. No.=36)
316 kg./h. of commercial stearine (I. No.=5.9)

Cold step

Wetting agent content of the dispersion: 0.17% by weight of sodium dodecylsulfate Separation products:
440 kg./h. of oleine (I. No.=89, turbidity point 6° C.)
179 kg./h. of solid fatty acids (I. No.=37)

The preceding specific embodiments are illustrative of the practice of the invention. It is to be understood, however, that other procedures known to those skilled in the art may be employed without departing from the spirit of the invention or the scope of the appended claims.

We claim:

1. In the continuous process for the separation of mixtures of fatty acids into fatty acid mixtures of different melting points by the steps of continuously dispersing a mixture of fatty acids consisting of an oily phase and a solid phase in a recycling aqueous wetting agent solution at a temperature whereby a dispersion of liquid and solid fatty acids is obtained, continuously separating said dispersion by centrifuging into a lighter phase consisting substantially of liquid fatty acids and a heavier phase consisting substantially of solid fatty acid particles dispersed in said aqueous wetting agent solution, continuously withdrawing said liquid fatty acids, continuously separating said solid fatty acids from said aqueous wetting agent solution, continuously withdrawing said solid fatty acids having a higher melting point than said liquid fatty acids and continuously recycling said aqueous wetting agent solution to said dispersing step, the improvement which consists in utilizing as said mixture of fatty acids, a mixture of fatty acids containing from 0.8% to 15% by weight of non-fatty acid organic impurities derived from the preparation of said fatty acid mixtures and continuously withdrawing a part of said recycling aqueous wetting agent solution and continuously replacing said withdrawn part of said recycling aqueous wetting agent solution with a fresh aqueous solution whereby the concentration of said recycling aqueous wetting agent solution is maintained substantially constant.

2. The process of claim 1 wherein the amount of said part of said recycling aqueous wetting agent solution withdrawn is from 10% to 70% by weight of said recycling aqueous wetting agent solution.

3. The process of claim 1 wherein the amount of said part of said recycling aqueous wetting agent solution withdrawn is from 15% to 70% by weight of said recycling aqueous wetting agent solution.

4. The process of claim 1 wherein said mixtures of fatty acids contain from 0.8% to 4.0% by weight of said non-fatty acid organic impurities and the amount of said recycling aqueous wetting agent solution withdrawn is from 10% to 40% by weight of said recycling aqueous wetting agent solution.

5. The process of claim 4 wherein said mixtures of fatty acids contain from 1% to 3% by weight of said non-fatty acid organic impurities and the amount of said recycling aqueous wetting agent solution withdrawn is from 15% to 30% by weight of said recycling aqueous wetting agent solution.

6. The process of claim 1 wherein said mixtures of fatty acids contain from 4% to 15% by weight of said nonfatty acid organic impurities and the amount of said recycling aqueous wetting agent solution withdrawn is from 20% to 70% by weight of said recycling aqueous wetting agent solution.

7. The process of claim 6 wherein said mixtures of fatty acids are undistilled cleaved triglyceride fatty acids.

8. The process of claim 1 wherein said recycling aqueous wetting agent solution contains electrolytes.

9. The process of claim 8 wherein said fresh aqueous solution continuously replacing said withdrawn part of said recycling aqueous wetting agent solution has the same concentration of wetting agent and electrolyte as said recycling aqueous wetting agent solution.

10. The process of claim 8 wherein said fresh aqueous solution continuously replacing said withdrawn part of said recycling aqueous wetting agent solution is water and said concentration of said recycling aqueous wetting agent solution is maintained constant by separately continuously adding wetting agent and electrolyte.

11. The process of claim 8 wherein said fresh aqueous solution continuously replacing said withdrawn part of said recycling aqueous wetting agent solution is an aqueous solution having the same electrolyte concentration as said recycling aqueous wetting agent solution and said concentration of said recycling aqueous wetting agent solution is maintained constant by separately continuously adding wetting agent.

12. The process of claim 1 wherein said mixture of fatty acids is cleaved tallow.

13. The process of claim 1 wherein said mixture of fatty acids is a liquid fatty acid mixture previously separated by the process.

14. The process of claim 1 wherein said mixture of fatty acids is a solid fatty acid mixture previously separated by the process.

15. The process of claim 1 wherein said dispersion of liquid and solid fatty acids is obtained by heating said heavier phase consisting essentially of solid fatty acid particles dispersed in said aqueous wetting agent solution, previously separated by the process.

16. A continuous process for the separation of mixtures of cleaved tallow fatty acids containing from 0.8% to 4% by weight of non-fatty acid organic impurities derived from the cleavage of tallow, into oleine and stearine which consists of the steps of continuously first dispersing said mixture of cleaved tallow fatty acids consisting of an oily phase and a solid phase in a recycling aqueous wetting agent solution containing electrolytes at a temperature whereby a first dispersion of liquid and solid fatty acids is obtained, continuously separating said dispersion by centrifuging into a first lighter phase consisting essentially of liquid fatty acids and a first heavier phase consisting substantially of solid fatty acid particles dispersed in said aqueous wetting agent solution, continuously cooling said liquid fatty acids to form an oily phase and a solid phase, continuously second dispersing said cooled fatty acids in a recycling aqueous wetting agent solution containing electrolytes at a temperature whereby a second dispersion of liquid and solid fatty acids is obtained, continuously separating said second dispersion by centrifuging into a second lighter phase consisting of liquid oleine and a second heavier phase consisting substantially of solid fatty acid particles dispersed in said aqueous wetting agent solution, continuously withdrawing said liquid oleine, continuously separating said second heavier phase into solid fatty acids and aqueous wetting agent solution containing electrolytes, continuously recycling said solid fatty acids to said dispersing step of said mixtures of cleaved tallow fatty acids, continuously recycling said aqueous wetting agent solution containing electrolytes to said dispersing steps, continuously heating said first heavier phase consisting substantially of solid fatty acid particles dispersed in said aqueous wetting agent solution to form a third dispersion of liquid and solid fatty acids in said aqueous wetting agent solution, continuously separating said third dispersion by centrifuging into a third lighter phase consisting essentially of liquid fatty acids and a third heavier phase consisting substantially of solid fatty acid particles dispersed in said aqueous wetting agent solution, continuously recycling said liquid fatty acids to said dispersing step of said mixture of cleaved tallow fatty acids, continuously separating said third heavier phase into stearine and aqueous wetting agent solution containing electrolytes, continuously withdrawing said stearine, continuously recycling said aqueous wetting agent solution to said dispersing steps, and continuously withdrawing from 10% to 40% by weight of said recycling aqueous wetting agent solution containing electrolytes and continuously replacing said withdrawn recycling aqueous wetting agent solution containing electrolytes with a fresh aqueous solution whereby the concentration of wetting agent and electrolytes of said recycling aqueous wetting agent solution containing electrolytes is maintained substantially constant.

References Cited

UNITED STATES PATENTS

| | | | |
|---|---|---|---|
| 2,800,493 | 7/1957 | Stein et al. | 260—419 |
| 3,458,545 | 7/1969 | Faur et al. | 260—419 |
| 3,541,122 | 11/1970 | Payne et al. | 260—419 |
| 3,549,676 | 12/1970 | Hartmann et al. | 260—419 |

FOREIGN PATENTS

| | | | |
|---|---|---|---|
| 165,094 | 9/1955 | Australia | 260—419 |

LEWIS GOTTS, Primary Examiner

E. G. LOVE, Assistant Examiner